(No Model.)

J. D. ABBOTT.
SAW.

No. 295,967. Patented Apr. 1, 1884.

Attest

Inventor
John D. Abbott
By Thos. J. Sprague Atty

UNITED STATES PATENT OFFICE.

JOHN D. ABBOTT, OF READING, MICHIGAN, ASSIGNOR OF ONE-THIRD TO ANDREW M. R. FITZSIMMONS AND J. WELLINGTON CHAPMAN, BOTH OF SAME PLACE.

SAW.

SPECIFICATION forming part of Letters Patent No. 295,967, dated April 1, 1884.

Application filed February 2, 1884. (No model.)

*To all whom it may concern:*

Be it known that I, JOHN D. ABBOTT, of Reading, in the county of Hillsdale and State of Michigan, have invented new and useful Improvements in Crosscut-Saws; and I hereby declare that the following is a full, clear, and exact description thereof, reference being had to the accompanying drawings, which form a part of this specification:

This invention relates to certain new and useful improvements in the construction and operation of crosscut-saws, such as are usually employed in lumbering operations and in sawing logs into lengths.

The invention consists, primarily, in the peculiar formation, construction, and operation of the cutting-teeth; secondarily, in the peculiar construction and operation of the raker-tooth; and, thirdly, in the combination of the above-named parts in a complete saw.

Figure 1:
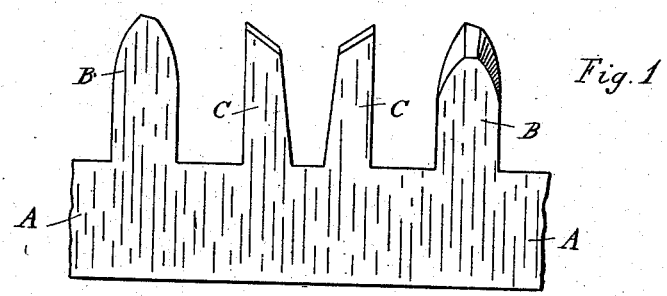
Figure 2:
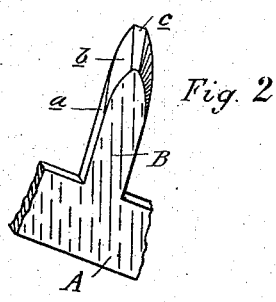
Figure 3:
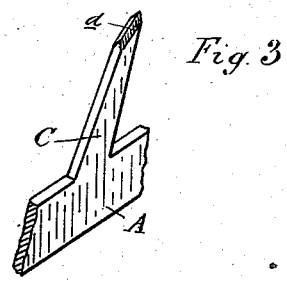

Figure 1 is a side elevation of a section of a crosscut-saw provided with my improved teeth and rakers. Fig. 2 is a detached perspective view of one of the teeth. Fig. 3 is a detached perspective view of one of the rakers.

In the accompanying drawings, which form a part of this specification, A represents the blade of the saw, which may be provided at each end with any of the known appliances by means of which tangs may be secured, or other desired attachments made where the saw is operated by mechanical power.

B represents the teeth, and C the rakers. The teeth and rakers are made by any of the known ways of cutting or gumming such teeth with the blade. The teeth are formed with parallel edges to a point marked $a$. Thence such edges approach each other in curved lines, as shown at $b$, and the tooth terminates in a straight cutting-edge, $c$, such edge, however, not being at right angles to the straight edges of said teeth, but at an obtuse angle thereto, so that the highest point cuts in one of the reciprocating motions of the saw, and the other lower corner cuts in the opposite reciprocation. From the point $a$ this tooth is filed on the curved edges upon a bevel to produce a cutting-edge at the extreme outer parts, and the point made by the obtuse angle hereinbefore described is filed to produce a regular chisel-edge at that point, thereby forming a tooth that cuts perfectly smooth in either direction of the travel of the saw, for in the usual manner in which saws are used there is a slight oscillating motion given to such saw at the termination of each of its reciprocating strokes, by which means both the cutting-edges herein provided and the chisel-edge are brought alternately into action, cutting a smooth kerf upon both sides of the path in which the saw travels. The rakers are cut or gummed in the usual way, and the point thereof is cut at an acute angle, $d$, to the body thereof. The point is then filed on either side, thereby producing a V-shaped point, as shown in the detached view.

This form of raker presents such a point that the operation of the saw is materially aided in cutting through knots, while at the same time it cuts the center of the path, leaving the teeth following to cut the sides of the kerf. It also acts efficiently as a cleaner of the débris left in the kerf by the operation of the teeth.

What I claim as my invention is—

In a crosscut-saw, the teeth formed with parallel sides leading to curved cutting-edges on either side, and approaching each other toward the point, which latter is a chisel-point formed at an obtuse angle to the parallel edges of said teeth, substantially as described.

JOHN D. ABBOTT.

Witnesses:
J. W. CHAPMAN,
H. P. PARMELEE.